United States Patent [19]
O'Neil et al.

[11] Patent Number: 5,148,442
[45] Date of Patent: Sep. 15, 1992

[54] DYE LASING ARRANGEMENT INCLUDING AN OPTICAL ASSEMBLY FOR ALTERING THE CROSS-SECTION OF ITS PUMPING BEAM AND METHOD

[75] Inventors: Richard W. O'Neil, Pleasanton, Calif.; William C. Sweatt, Alburquerque, N. Mex.

[73] Assignee: The United States of America as represented by the Department of Energy, Washington, D.C.

[21] Appl. No.: 363,310

[22] Filed: Jun. 8, 1989

Related U.S. Application Data

[63] Continuation of Ser. No. 915,204, Sep. 30, 1986, abandoned.

[51] Int. Cl.$^5$ .................... H01S 8/09; B23K 29/00
[52] U.S. Cl. ........................... 372/71; 372/53; 372/51; 372/101; 359/337; 359/345
[58] Field of Search ............ 350/436, 613, 624; 372/101, 71, 54

[56] References Cited

U.S. PATENT DOCUMENTS

| | | | |
|---|---|---|---|
| 3,613,659 | 10/1971 | Phillips | 350/614 |
| 3,710,277 | 1/1973 | Forbes | 372/54 |
| 4,195,913 | 4/1980 | Dourte et al. | 350/613 |
| 4,289,380 | 9/1981 | Tucker | 350/616 |
| 4,327,972 | 5/1982 | Brunsting | 350/630 |
| 4,410,237 | 10/1983 | Veldkamp | 350/421 |
| 4,475,027 | 10/1984 | Pressley | 350/433 |
| 4,518,232 | 5/1985 | Dogenais | 350/620 |
| 4,547,044 | 10/1985 | Jain et al. | 350/433 |
| 4,570,081 | 2/1986 | Baldwin | 372/70 |
| 4,627,068 | 12/1986 | Johnson et al. | 372/70 |

OTHER PUBLICATIONS

Dagenais et al.; "Optical Beam Shaping of a ... Illumination"; Mar. 1, 1985, Appl. Opt., vol. 24, #5, pp. 671–675.

Chao, S. L.; "Astigmatic Resonator ... Enhancement"; Mar. 1, 1985, Appl. Opt.; vol. 24, #5, pp. 676–681.

Li et al.; Comparison Between Several ... Laser Beam; Jul. 1986, Rev. Phys. Appl., vol. 21, #7, pp. 425–433; Abst.

Schall, M. S.; "Optical Analysis ... Axerogen", Apr. 19, 1981, SPIE Int. Soc. Opt. Eng., vol. 288, pp. 93–103; Abst.

*Primary Examiner*—Nelson Moskowitz
*Attorney, Agent, or Firm*—Miguel A. Valdes; Roger S. Gaither; William R. Moser

[57] ABSTRACT

An optical assembly is disclosed herein along with a method of operation for use in a dye lasing arrangement, for example a dye laser oscillator or a dye amplifier, in which a continuous stream of dye is caused to flow through a given zone in a cooperating dye chamber while the zone is being illuminated by light from a pumping beam which is directed into the given zone. This in turn causes the dye therein to lase and thereby produce a new dye beam in the case of a dye laser oscillator or amplify a dye beam in the case of a dye amplifier. The optical assembly so disclosed is designed to alter the pump beam such that the beam enters the dye chamber with a different cross-sectional configuration, preferably one having a more uniform intensity profile, than its initially produced cross-sectional configuration. To this end, the assembly includes a network of optical components which first act on the beam while the latter retains its initially produced cross-sectional configuration for separating it into a plurality of predetermined segments and then recombines the separated components in a predetermined way which causes the recombined beam to have the different cross-sectional configuration.

22 Claims, 6 Drawing Sheets

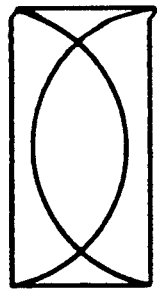
FIG.6C
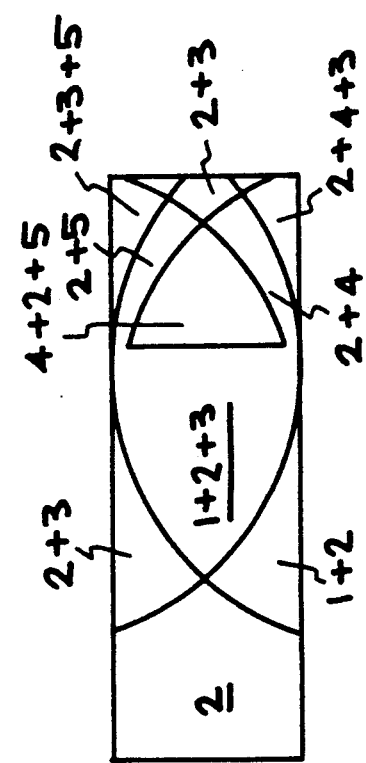
FIG. 8
FIG.6B
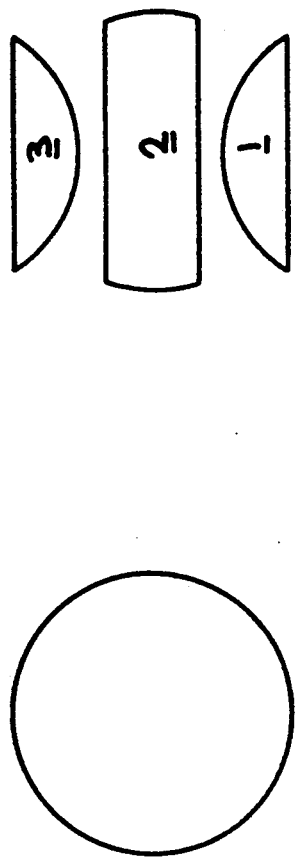
FIG.6A
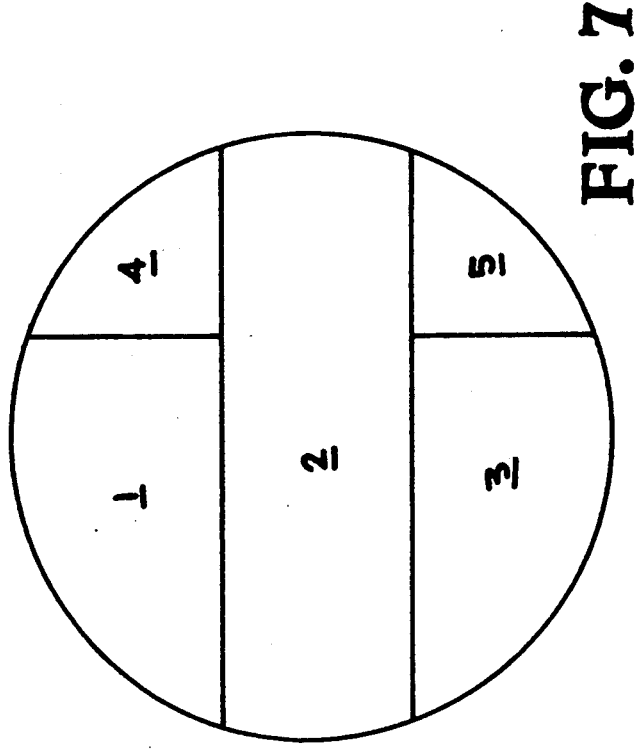
FIG. 7

DYE LASING ARRANGEMENT INCLUDING AN OPTICAL ASSEMBLY FOR ALTERING THE CROSS-SECTION OF ITS PUMPING BEAM AND METHOD

FIELD OF THE INVENTION

The United States Government has rights in this invention pursuant to Contract No. W-7405-ENG-48 between the United States Department of Energy and the University of California for the operation of the Lawrence Livermore National Laboratory.

This is a continuation of application Ser. No. 915,204 filed Sep. 30, 1986, now abandoned.

BACKGROUND OF THE INVENTION

The present invention relates generally to a dye lasing arrangement such as a dye laser oscillator or dye amplifier in which a continuous stream of dye is caused to flow through a given zone in a cooperating dye chamber while the zone is being illuminated by light from a pumping beam. This in turn causes the dye flowing through the zone to lase and thereby initially produce a dye beam in the case of a dye laser oscillator or amplify an existing dye beam in the case of a dye amplifier. The present invention relates more particularly to an optical assembly for altering the cross-sectional configuration of the pumping beam such that the beam enters the dye chamber so as to more uniformly and more efficiently illuminate the lasing zone.

Lasing arrangements of the type cited above, specifically a dye laser amplifier and a dye laser oscillator, are disclosed in copending U.S. application Ser. No. 911,271, filed Sep. 22, 1984 and entitled HIGH FLOW VELOCITY DYE LASER AMPLIFIER and reference is made to this application which has been assigned to the assignee of the present application. In each of these arrangements, a continuous stream of dye is caused to flow through a given zone in a cooperating dye chamber. At the same time, this zone is illuminated by light from a pumping beam, specifically a copper vapor laser beam, in order to cause the dye flowing through the zone to lase and thereby initially produce a dye beam or amplify an existing one. In either case, in order to make the lasing operation an efficient one, it is important that the entire lasing zone be uniformly illuminated by the pumping beam or as uniformly illuminated as possible. In the arrangements disclosed in the patent application just recited, each pumping beam used enters the dye chamber through a cooperating window which is rectangular in configuration. At the same time, the pumping beam, a copper vapor laser beam in the case of the disclosed arrangements, is initially produced with a circular cross-sectional configuration. Therefore, in order to more efficiently illuminate the lasing zone within the dye chamber, it is at least necessary to conform the cross-sectional configuration of the pump beam to that of the entry window. However, the intensity profile of this beam, in circular cross-section, is typically not uniform as will be discussed below. Therefore merely altering its cross-section from one which is circular to one which is rectangular will not make its intensity profile any more uniform, although this is a first step in more uniformly illuminating the lasing zone.

In the case of copper vapor laser beams, if the effects known as radial dynamics resulting from the production of such a beam are not compensated for, the beam is produced with a "chevron" effect. This means that its intensity profile in cross-section varies between one extreme such that the intensity is concentrated in the center section of the beam and an opposite extreme such that its intensity is concentrated within an outer annulus. Even if the beam were produced without the effects of radial dynamics, it would nevertheless tend to have a non-uniform cross-sectional intensity profile. For example, the "perfect" laser beam has an intensity profile which is Gaussian distributed in cross-section. Therefore, even if the "perfect" pumping beam is acted upon merely to convert its circular cross-section to one which corresponds to the rectangular configuration of the inlet window into the dye chamber, as discussed immediately above, while the entire lasing zone would be illuminated by light from the pumping beam, the zone would not be illuminated uniformly since the intensity profile of the rectangular beam would not be uniform in cross-section.

Still referring to the background of the present invention, the present comments pertain to a dye laser amplifier or oscillator pumped by a laser source such as a copper vapor laser with a round output beam. The lasing or amplifying volume is shown in FIG. 9. The dye flows in the y direction, the rectangular dye laser beam propagates in the z direction and the pump beams enter the rectangular volume from the plus x and minus x directions. The pump beams should illuminate as little dye outside the volume swept by the dye laser beam as possible. Aside from the obvious waste of pump power, there is a more important reason to do so. Pumped volume outside the swept region will spontaneously emit photons that will sap power out of the swept region. These photons will not have the desired wavelength and some of them will propagate forward through the system being amplified by succeeding amplifiers thus wasting more pump power. This "amplified spontaneous emission" will have poor wavefront quality so it can spill onto mirror and window mounts, potentially damaging them. Minimizing the deposition of pump energy outside the swept volume places three conditions on the pump beam. First, a hard aperture should be imaged into the dye cell to minimize diffractive blurring. Second, the pump beam should be collimated so the beam holds its shape as it propagates through the cell. Third, the alignment system must maintain pointing.

One tries to inject a dye beam intense enough so it can extract all of the energy deposited by the pump beam; that is, operating in the saturated gain regime. If that is the case, the output intensity is roughly equal to the input intensity plus the integral over the ray path of the pump intensity times the conversion efficiency.

$$\text{Output}(y) = \text{Input}(y) + [\text{Eff.} * \text{Pump}(y,z)]dz$$

Assuming that the input dye beam is relatively uniform, the output dye beam will only be uniform in y if the integral does not vary much in that dimension. If the dye beam has a relatively uniform intensity, it will be more efficient in laser chemical processes and will show improved diffraction characteristics, thus reducing transmission losses. "Hot spots" in the beam also tend to damage optics.

The previous art in transverse pumping of dye laser amplifiers with laser light consisted of transforming the round pump beam into an elliptical one whose "height" (y dimension in FIG. 9) was matched to the laser beam to be amplified, and whose "width" (z dimension in FIG. 9) was chosen to be long enough to keep the pump beams from burning the input windows. An elliptical beam fills 78% of a "best fit" rectangular dye amplifier cavity. Thus the pumped area swept out by a ray passing through the center of the cavity is much greater than that swept by a ray near the top or bottom of the cavity. A more uniform intensity dye laser beam would propagate with less diffraction loss and can have a higher average flux without damaging optics. The improvement in dye laser pumping described in this patent application involves "slicing" the laser beam into three slabs and superimposing them on top of one another in the dye cell. This greatly improves the uniformity of pumping and thus the amplified beam. A description of this will be presented in the next section.

The pump beams should be collimated in the dye cell so they maintain a constant cross-section through the cell. Furthermore, a hard aperture in the pump laser beam should be imaged into the cell. This minimizes diffraction spreading so there is as little pumping outside the swept region as possible.

SUMMARY OF THE INVENTION

In view of the foregoing, one object of the present invention is to improve the efficiency of operation of a lasing arrangement of the general type described above in an uncomplicated manner.

A more particular object of the present invention is to provide the last-mentioned improved efficiency by insuring that the lasing zone within the dye chamber of the lasing arrangement is uniformly illuminated by the pumping beam and that all or at least substantially all of the light from the pumping beam is used to this end.

Another particular object of the present invention is to provide an uncomplicated and yet reliable means for and method of acting on the pumping beam just mentioned so that it has a more uniform intensity profile in cross-section and one which, at the same time, corresponds in configuration to the configuration of the co-operating inlet window into the dye chamber.

As indicated above, the lasing arrangement disclosed herein is one in which a continuous stream of dye is caused to flow through a given zone in a cooperating dye chamber while the zone is being illuminated by light from a pumping beam which is directed into the given zone. This in turn causes the dye therein to lase and thereby initially produce a dye beam in the case of a dye laser oscillator or amplify an existing dye beam in the case of dye amplifier. In accordance with the present invention, this lasing arrangement includes an optical assembly for altering the pumping beam such that the latter enters the dye chamber with a different cross-sectional configuration than its initially produced cross-section. In order to accomplish this, the optical assembly acts on the pumping beam while the latter retains its initially produced cross-sectional configuration in order to separate the pumping beam into a plurality of axial segments, that is, segments which extend in the direction of the pumping beam's axis. Thereafter, the assembly recombines the separated segments in a predetermined way which causes the recombined beam to have the different cross-sectional configuration. In the actual embodiment disclosed, the pumping beam has an initially produced cross-section which is circular in configuration and one which is not uniform in intensity. At the same time, the lasing zone within the dye chamber of the lasing arrangement is rectangular. However, in this specific embodiment, the optical assembly separates this initially produced beam into a plurality of predetermined segments and then recombines these segments in a partially overlapping manner such that the beam's new cross-section corresponds in configuration to the lasing zone and, at the same time, is more uniform in intensity.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The optical assembly just discussed briefly and its method of operation will be described in more detail hereinafter in conjunction with the drawings wherein:

FIGS. 6A, 6B and 6C are cross-sectional views of the pumping beam acted upon by the assembly of FIG. 5 at three different points within the optical assembly, specifically sections 6A—6A, 6B—6B, and 6C—6C;

FIGS. 7 and 8 diagrammatically illustrate a different type of alteration of a pump beam;

DETAILED DESCRIPTION OF THE INVENTION

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
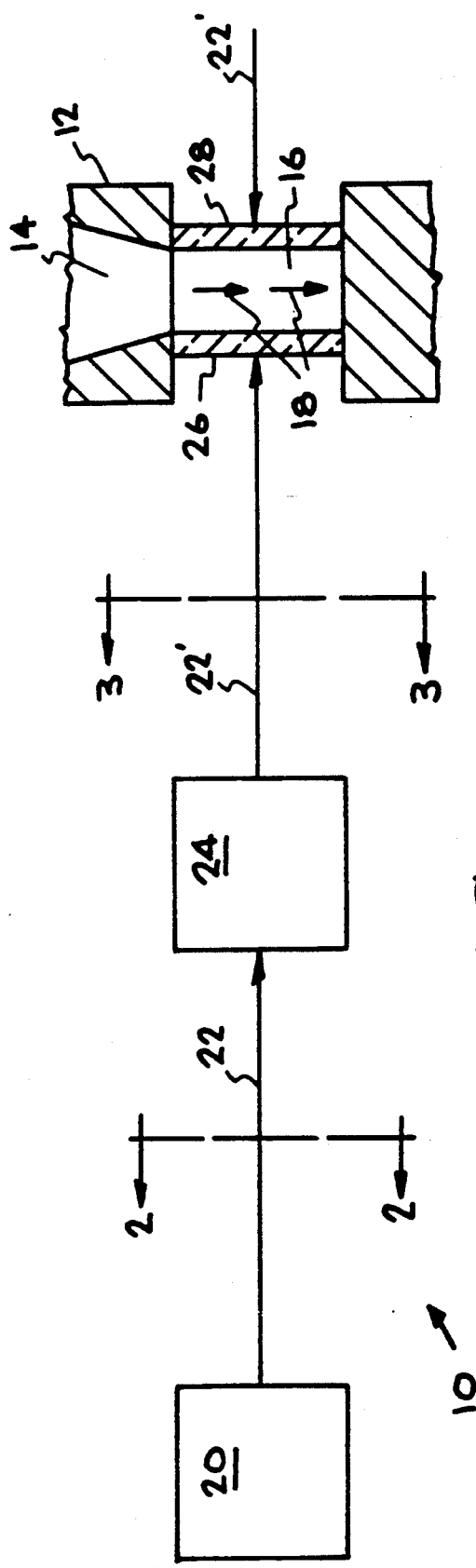
FIG. 1 diagrammatically illustrates a lasing arrangement of the general type described above but one which includes an optical assembly designed in accordance with the present invention to alter the lasing arrangement's pumping beam or beams such that each beam enters the dye chamber of the arrangement with a different cross-sectional configuration, as briefly discussed above.

Turning now to the drawings, attention is first directed to FIG. 1 which diagrammatically illustrates a lasing arrangement in which a continuous stream of dye is caused to flow through a given zone in a cooperating dye chamber while the zone is illuminated by light from a pumping beam in order to cause the dye flowing through the zone to lase and thereby produce a new dye beam or amplify an existing one. The lasing arrangement is generally indicated by the reference numeral 10 and includes means 12 for defining the overall dye chamber which is shown at 14 and its lasing zone which is shown at 16. Means not shown are provided for causing a continuous stream of dye to flow through zone 16, as indicated by the arrows 18. At the same time, the lasing arrangement includes suitable means 20 for producing a pumping beam 22 which, in the embodiment illustrated, is a copper vapor laser beam.

In accordance with the present invention, overall lasing arrangement 10 also includes an optical assembly generally indicated at 24 for altering beam 22 such that the altered beam which is indicated at 22' has a different cross-sectional configuration than the cross-sectional configuration of unaltered beam 22. As illustrated in FIG. 1, the altered beam is directed into the lasing zone 16 of dye chamber 14 through a cooperating pump window 26 in order to pump the dye passing therethrough and thereby produce or amplify the dye beam (not shown). A second identical pumping beam 22' may be directed into the lasing zone through a confronting window 28 in order to add more pumping power to the overall arrangement.

With the exception of optical assembly 24, all of the components making up overall arrangement 10 are readily available in the art. As indicated previously, this arrangement can be a dye laser oscillator for producing a dye beam initially or it can be a dye amplifier for amplifying an existing dye beam. Two such arrangements are discussed in the previously recited copending patent application.

Figure 2:
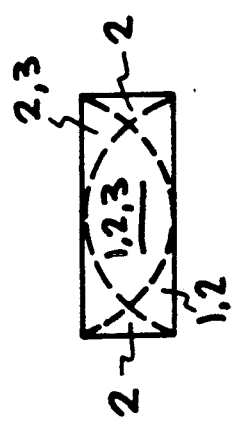
FIG. 2 is a cross-sectional view of an initially produced pumping beam, taken generally along lines 2—2 in FIG. 1.
Figure 3:
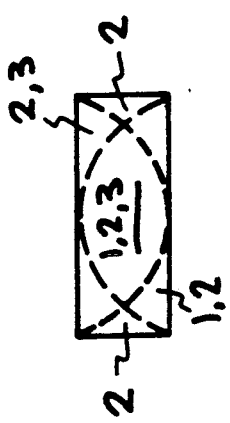
FIG. 3 is a cross-sectional view of the pumping beam after its cross-section has been altered by the optical assembly, as taken generally along lines 3—3 in FIG. 1.

Turning to FIG. 2, unaltered pumping beam 22 is shown with a circular cross-section. Moreover, it will be assumed that the beam is most intense about its outer annulus, as would occur at one extreme as a result of the chevron effect. As will be discussed in more detail below, optical assembly 24 separates the beam 22 into three axial segments, that is, segments which extend in the direction of the beam's axis, specifically the segments 1, 2 and 3 illustrated in FIG. 2. Note that the center segment extends diametrically across the center of the beam while segments 1 and 3 make up the rest of the beam on opposite sides of segment 2. As will also be discussed, assembly 24 recombines the three segments to form altered beam 22' so that both of the segments 1 and 3 overlap segment 2 and partially overlap one another, as illustrated in FIG. 3. In this way, the intensity profile of altered beam 22' in cross-section is substantially more uniform than the corresponding profile of beam 22. Moreover, segment 2 of beam 22 which defines the outermost boundary of altered beam 22' is selected to correspond in configuration to window 26 at the point along beam 22' where it enters the window. In other words, window 26 has the same rectangular outer peripheral configuration as segment 2 of beam 22 which, in turn, determines the outermost cross-sectional configuration of beam 22'. As a result, the entire beam 22' is used in illuminating lasing zone 16 (which is defined by the configuration of window 26) and it does so in a substantially uniform manner.

Figure 4:
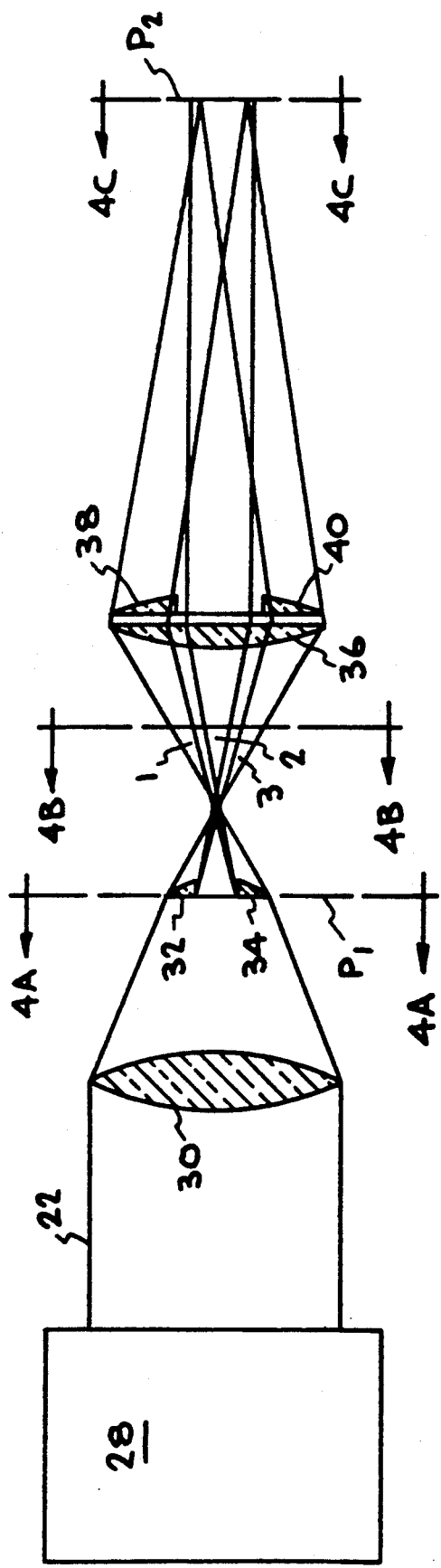
FIG. 4 is a diagrammatic illustration, in perspective view, of an optical assembly designed in accordance with one embodiment of the present invention.
Figure 4C:
FIGS. 4A–4C are sectional views of the beam associated with the assembly of FIG. 4, taken generally along lines 4A—4A, 4B—4B, and 4C—4C in FIG. 4, respectively.
Figure 4B:
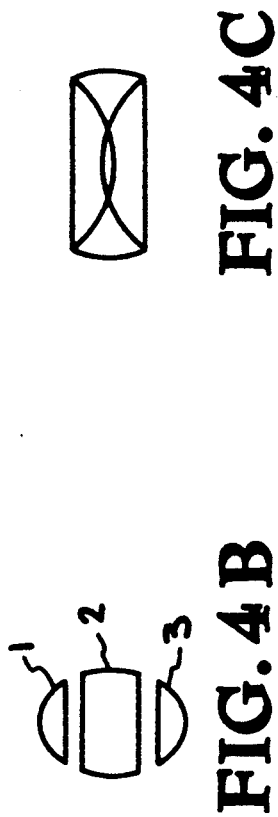
Figure 4A:

Turning now to FIG. 4, attention is directed to some of the components which are used in forming overall assembly 24 in order to form beam 22' from beam 22. One such component is a refractive lens 30 located at the input of the assembly. This lens acts upon the incoming beam in order to focus the image of the beam at the output of laser 20 onto plane $P_1$. A pair of light refracting wedges 32 and 34 are located within this imaging plane in spaced-apart relationship to one another such that a segment of light corresponding to segment 2 passes between the two wedges (see FIG. 4A). At the same time, the wedges 32 and 34 respectively act on segments 1 and 3 of beam 22 in order to separate these segments from segment 2, as illustrated in FIG. 4B. A second lens 36 reimages segment 2 onto a plane $P_2$ which preferably extends centrally through lasing zone 16 in the direction of the flow of dye 18. At the same time, a second pair of refractive wedges 38 and 40 cooperate with lens 36 in order to image segments 1 and 3 on segment 2 in plane $P_2$ in the manner illustrated in FIG. 3 (see also FIG. 4C).

From the foregoing description of overall optical assembly 24, it should be apparent that the lens 30 and light reflective wedges 32 and 34 cooperate with one another to separate beam 22 into axial segments 1, 2 and 3. At the same time, the lens 36 and light refractive wedges 38 and 40 cooperate with one another in order to recombine these segments in the overlapping fashion illustrated in FIG. 3. It should be equally apparent that the physical makeup of each of these optical components will depend upon how beam 22 is to be segmented and how it is to be recombined. In this regard, it is to be understood that the present invention is not directed to these individual components per se. Rather, based on the teachings herein, one with ordinary skill in the art could design the necessary optical components required to separate beam 22 and recombine it in the desired manner.

Still referring to FIG. 4, the "slicer" component of assembly 10 cuts the pump beam into three (or more) slabs with very crisp edges. The recombiner component retilts the slabs individually so they will be overlapped in the dye amplifier. A schematic representation is shown in FIG. 4 as described above. The slicer is located in an image plane where the pump beam has relatively sharp, crisp edges with little diffraction spilling. In this representation, it consists of two prisms (32, 34) that retilt the top and bottom slabs. The tilt introduced by 32 and 34 must be enough to completely separate the slabs at the recombiner plane. The beam slabs arriving at the recombiner are not at an image plane so they are fuzzy due to aberration and diffractive effects. In this example, the slabs are steered so they cross each other. They could be turned out though for most real systems, the crossing configuration minimizes the size of the optics between the slicer and recombiner.

The "recombiner" retilts the pump beam slabs so they are superimposed in the final image plane located at the center of the dye cell. The refractive schematic in FIG. 4 represents the recombiner as two prisms (38, 40). These elements must be adequately oversized to intercept the aberrated pump beam slabs. As stated earlier, the beam slabs will exhibit diffraction and aberration spreading and probably some pointing error.

Figure 5:
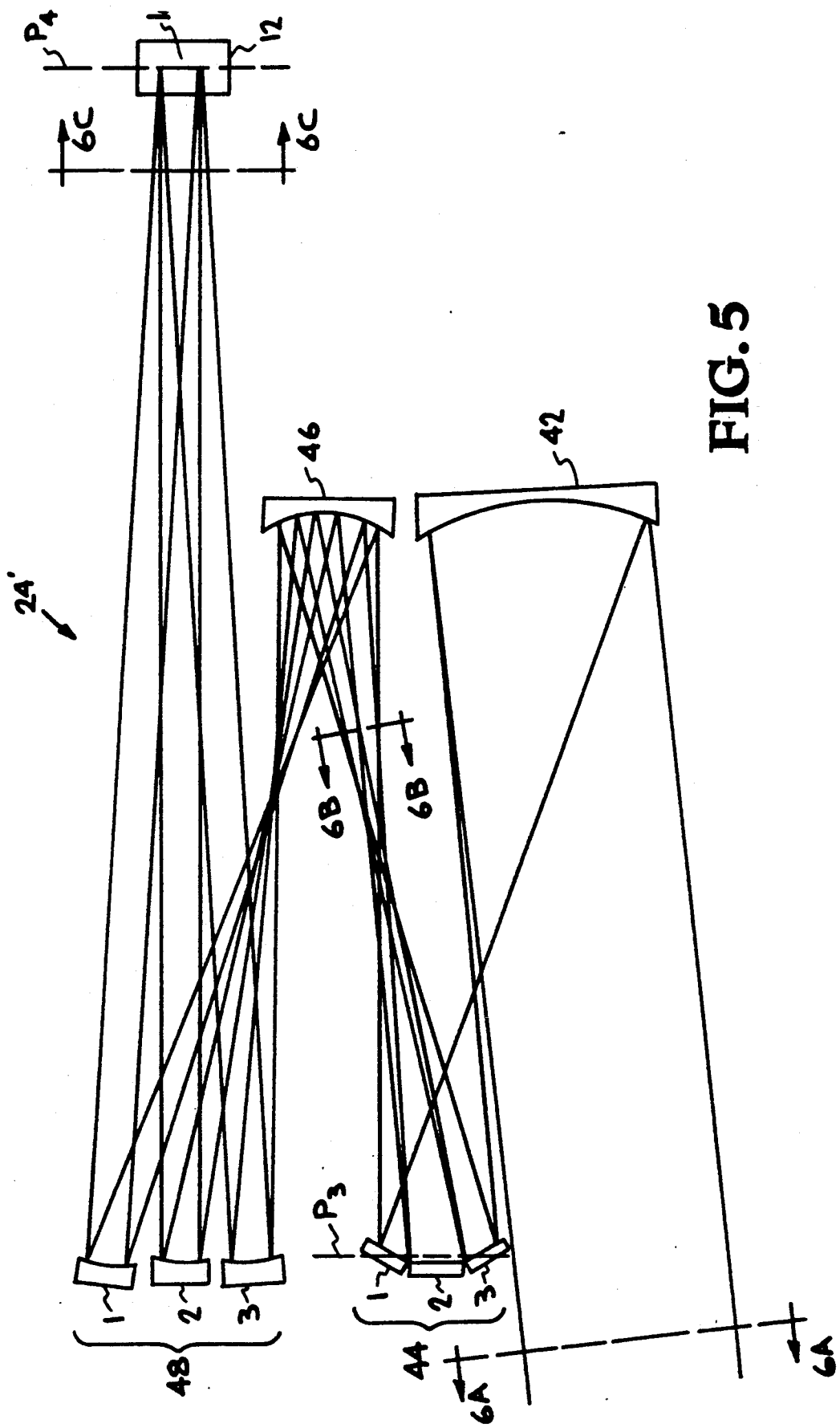
FIG. 5 is a diagrammatic illustration, in perspective view, of an optical assembly designed in accordance with another embodiment of the present invention.
Figure 9:
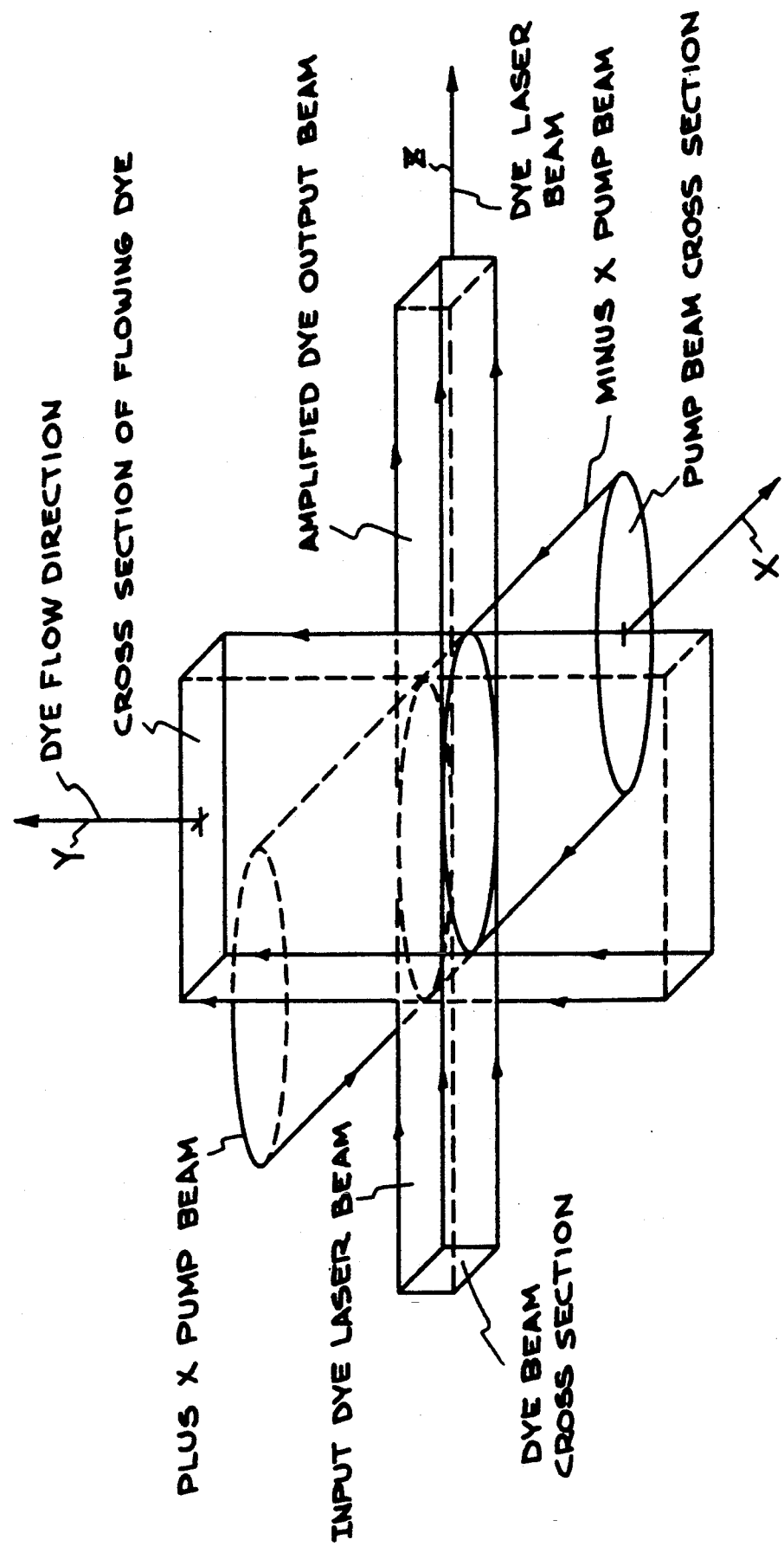
FIG. 9 diagrammatically illustrates a lasing arrangement of the general type in the prior art for purposes of illustrating the present invention.

Referring to FIG. 5, attention is directed to a modified optical assembly which is generally designated by the reference numeral 24'. This assembly serves the same purpose as assembly 24, that is, it acts on beam 22 in order to provide beam 22'. To this end, assembly 24' includes the same type of input lens 42 which images beams 22 at the output of pump 20 onto a plane $P_3$. The cross-section of the beam between lens 42 and plane 3 is circular, as illustrated in FIG. 6A. A light reflecting device 44 having three distinct light reflecting sections 1, 2 and 3 is located in the imaging plane $P_3$ and serves the same purpose as the two wedges 32 and 34, that is, to separate beam 22 into the three beam segments 1, 2 and 3. However, as best illustrated in FIG. 6B, segments 1 and 3 are inverted as a result of the reflective characteristics of device 44. Specifically, the upper section 1 of the device reflects segment 1 of the beam to a position below segment 2 and section 3 of the device reflects segment 3 of the beam to a position above segment 2. The device 46 acts on these three segments to return segments 1 and 3 to their original positions relative to segment 2, although all three segments remain spaced apart from one another. A light reflective device 48 which also forms part of assembly 24' is divided into three sections 1, 2 and 3. The section 2 acts on segment 2 of the light beam in order to image the latter onto plane $P_4$. At the same time, sections 1 and 3 of device 48 respectively act on segments 1 and 3 of the beam in order to image these two latter segments onto segment 2 within plane $P_4$ in the same overlapping fashion illustrated in FIG. 3. Plane $P_4$ extends through the lasing zone 16 in the same manner as plane $P_2$.

From the foregoing description of optical assembly 24' it should be apparent that lens 42 and the light reflective devices 44 and 46 serve to separate the beam 22 into three segments in the same manner as previously described optical components 30, 32 and 34 and that the light reflecting device 48 serves to recombine these segments in the same manner as components 36, 38 and 40. It should also be apparent that these various optical components making up assembly 24' will vary in design depending upon exactly how the beam is to be separated and how it is to be recombined. Like the components making up assembly 24, the components making up assembly 24' can be readily provided by those with ordinary skill in the art in view of the teachings herein. For example, it may be desirable to separate beam 22 into more than three axial segments, for example the five segments illustrated in FIG. 7. It may also be desirable to recombined these segments in the manner illustrated in FIG. 8. To this end, note the segments have been numbered 1, 2, 3, 4 and 5. In view of the teachings herein, one with ordinary skill in the art could provide the overall optical assembly with the necessary optical components to make this conversion.

Still referring to FIG. 5, a real high average power laser system should be designed with reflective optical components wherever possible. A slicer/recombiner system using reflective components is shown in FIG. 5 as discussed above. Mirror 42 represents the preceding imaging optics that relay a hard aperture onto the slicer, mirror 44. Mirrors 46 and the recombiner 48 work together to relay this image into the dye cell. The slicer and recombiner mirrors can do double duty as shown here. They are both part of the imaging system that relays a collimated image to the dye cell. Note that the pump beam slabs reflecting off the slicer cross minimizing the size of mirror 46 and the (y) distance between the three recombiner mirrors. The segments of the slicer are hard-mounted as close together as possible to minimize the power absorbed and scattered by the two interfaces. The relative tilt angles of the slicer segments were set so the "fuzzy" beam slabs arriving at the recombiner mirrors would be separated. The recombiner mirrors are individually steerable so the pump beam slabs can be overlapped in the dye amplifier in the presence of thermo-optic effects.

In the initial conception, the pump beams were sliced into three slabs of equal height (y dimension). In actual practice, the center slab was chosen to have a height equal to 40% of the minimal beam diameter, thus the three slab mirrors have a combined height of 120% of the minimal beam diameter. This allows some pump beam defocus and centering tolerance which turns out to be exceedingly important. In the present system we have several pumping laser systems that are all superimposed in the dye cell(s which is an image plane. These individual beams are superimposed using polarization combination and by angularly multiplexing them (in the x-z plane). These high power individual beams must each be focused and pointed and inevitably there will be errors. The oversized slicer mirror allows for some focus and pointing error. Any pointing errors "downstream" will deposit energy outside the swept volume and leave some of it unpumped. However, small errors upstream have essentially no effect. The center slab is nearly rectangular so it uniformly fills essentially all of the cell with about 55% of the pump power, even if the beam is slightly mispointed or defocused. The other 45% of the power is also imaged into the cell, through not as uniformly. It doesn't matter if the remaining power is not equally spread between the top and bottom slicer segments.

Figure 10A:
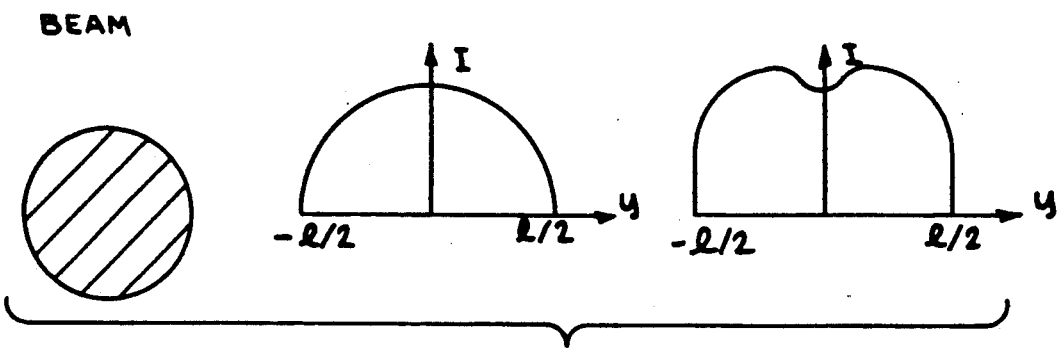
FIGS. 10A–C diagrammatically illustrate different pump beam intensity distribution profiles.

The dye beam intensity exiting an amplifier is equal to the input intensity plus the integral of the pump beam flux along a dye beam ray times the conversion efficiency. FIG. 10 depicts several possible pump beam intensity distributions and the dye beam intensities resulting in both the unsliced and the sliced cases. FIG. 10a shows a uniform pump beam intensity. Note the cosine fall-off in intensity in the unsliced configuration and the greater uniformity in the sliced case. Consider also the consequences of a slightly undersized or oversized pump beam image. In the unsliced case, the undersized beam would amplify the dye beam more at the center and not at all in the unpumped edges. An oversized beam would pump the dye outside the swept volume creating serious amplified spontaneous emissions problems. A beam centering error would leave one side of the dye beam unamplified while depositing energy outside of the swept volume on the other side. The slicer/recombiner system is tolerant to both defocus and decentering. Neither has much effect on the output dye beam's intensity.

Figure 10B:
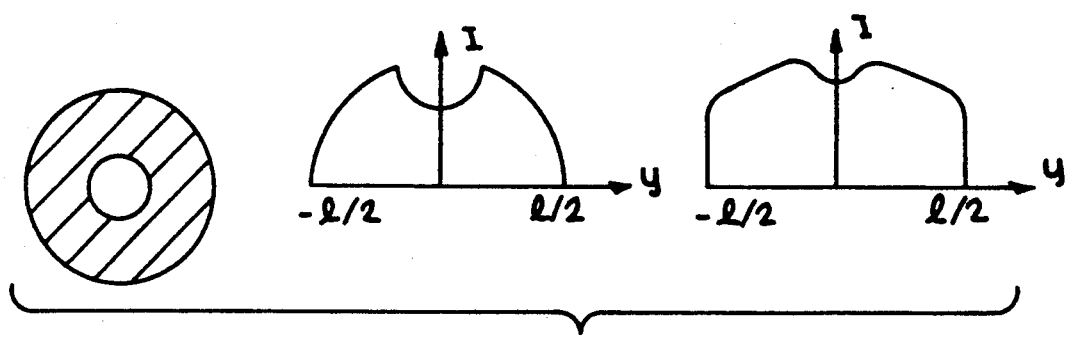
Figure 10C:
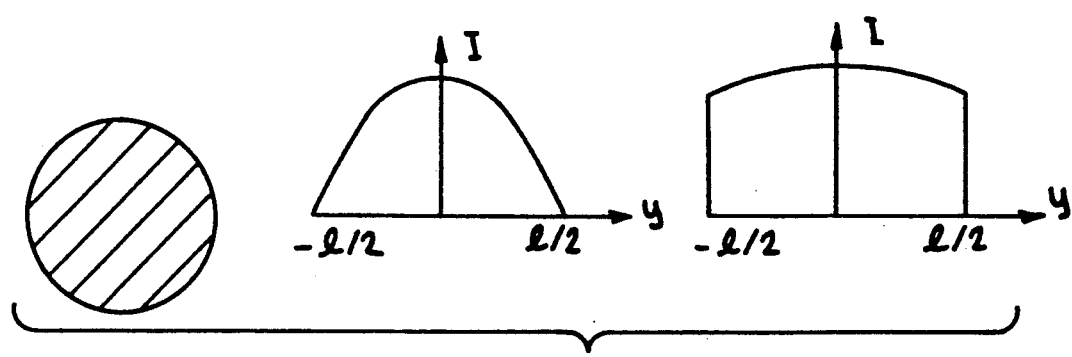
Figure 10D:
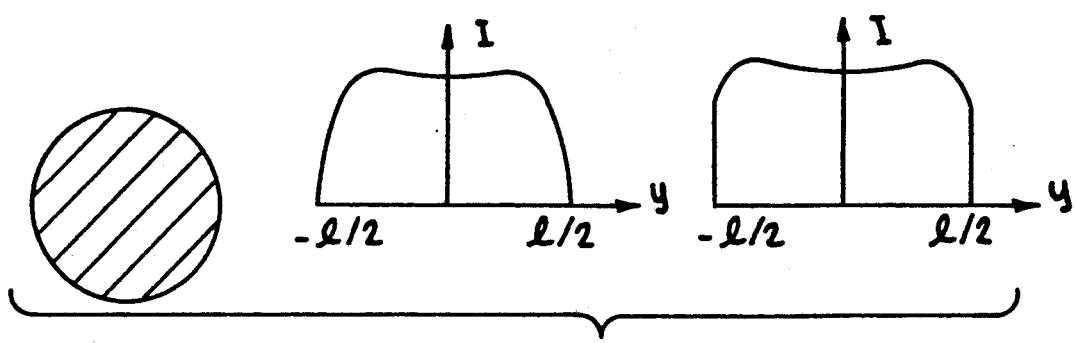

FIG. 10B shows the dye beam amplification when the pump beam has a central obscuration. The slicer smoothes the amplification and gets rid of the central obscuration. The slicer smooths the amplification and gets rid of the edge roll-off. FIG. 10C shows a Gaussian intensity pump beam. The slicer concept does away with the serious roll-off. FIG. 10D depicts a pump beam that has an intensity that varies parabolically in radius. This type of intensity profile results from radial thermal gradients, radially varying ion concwentrations, etc. The slicer concept has the least theoretical benefit for this pump beam distribution. However, remember that all laser pumping systems will have some decentering and defocus problems. This is particularly true when several pump beams are ganged together to pump the same dye laser amplifier. This is the most important advantage of the slicer/recombiner scheme.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a lasing arrangement in which a continuous stream of dye is caused to flow through a lasing zone in a cooperating due chamber while said lasing zone is being illuminated by a pumping beam having an initially produced cross-sectional configuration, which beam is directed through a dye chamber window into said lasing zone causing the dye therein to lase and thereby produce or amplify a dye beam, an optical assembly for altering said initially produced cross-sectional configuration of said pumping beam such that said pumping beam enters said dye chamber with an altered cross-sectional configuration corresponding generally to the cross-sectional configuration of said dye chamber window, said optical assembly comprising:
   (a) first optical means acting on said initially produced cross-sectional configuration of said pumping beam for separating said pumping beam into a plurality of separated segments, each of said segments having a portion which is entirely separate, non contiguous and non overlapping with adjacent segments, each of said separated segments propogating axially in the direction of said pumping beam and eventually converging; and
   (b) second optical means, separated from said first optical means for recombing said segments to produce a recombined pumping beam having said altered cross-sectional configuration corresponding generally to said cross-sectional configuration of said dye chamber window, wherein said entirely separate portions permit fine tuning of each of said segments.

2. An optical assembly according to claim 1 wherein said initially produced cross-sectional configuration of said pumping beam is substantially circular and said altered cross-sectional configuration is generally rectangular.

3. An optical assembly according to claim 2 wherein said first optical and second means, in addition to altering said initially produced cross-sectional configuration of said pumping beams, produce said recombined beam having a more uniform intensity profile in cross-section than said pumping beam prior to alteration in said optical assembly.

4. An optical assembly according to claim 3 wherein said first optical means separates said pumping beam into at least three said seperated segments and said second optical means recombines said segments in at least a partially overlapping way to provide said more uniform intensity profile.

5. An optical assembly according to claim 3 wherein said plurality of seperated segments consists of three said seperated segments.

6. An optical assembly according to claim 3 wherein said plurality of seperated segments consists of five said seperated segments.

7. An optical assembly according to claim 3 wherein said initially produced cross-sectional configuration of said pumping beam has an intensity profile which includes a lower intensity central circular section and a higher intensity outer annular section.

8. An optical assembly according to claim 1 wherein said first optical and second means, in addition to altering said initially produced cross-sectional configuration of said pumping beam, produce said recombined beam having a more uniform intensity profile in cross-section than said pumping beam prior to alteration in said optical assembly.

9. In a lasing arrangement in which a continuous stream of dye is caused to flaw through a lasing zone in a cooperating dye chamber while said lasing zone is being illuminated by a pumping beam having an initially produced cross-sectional configuration, which beam is directed through a dye chamber window into said lasing zone causing the dye within said lasing zone to lase and thereby produce or amplify a dye beam, an optical assembly for altering said initially produced cross-sectional configuration of said pumping beam so as to more uniformly illuminate said lasing zone, said assembly comprising:
   (a) first optical means acting on said initially produced cross-sectional configuration of said pumping beam to separate said pumping beam into at least three segments, each of said segments having a portion which is completely separate, independent and non-overlapping from adjacent segments, said segments extending axially in the direction of said pumping beam and ultimately converging, said segments including a central segment extending diametrically across said pumping beam and top and bottom axial segments on opposite sides of said central segments; and
   (b) second optical means, separate from said first optical means for recombining said segments in a predetermined fashion by superimposing said top and bottom axial segments on said central segment to produce a recombined beam to more uniformly illuminate said lasing zone.

10. In a lasing arrangement according to claim 9 wherein said initially produced cross-sectional configuration of said pumping beam is round and said dye chamber window is rectangular, and said optical assembly alters the cross-sectional configuration of said beam from a configuration which is circular to an altered cross-sectional configuration which corresponds in size and shape to the rectangular configuration of said dye chamber window.

11. In the operation of a lasing arrangement in which a continuous stream of dye is caused to flow through a lasing zone in a cooperating dye chamber while said zone is being illuminated by a pumping beam having an initially produced cross-sectional configuration which is directed through a dye chamber window into said lasing zone causing the dye therein to lase and thereby produce or amplify a dye beam, a method of altering said initially produced cross-sectional configuration of said pumping beam such that said pumping beam enters said dye chamber with an altered cross-sectional configuration corresponding generally to the cross-sectional configuration of said dye chamber window, said method comprising the steps of:

(a) separating said pumping beam having said initially produced cross-sectional configuration into a plurality of separated segments which extend axially in the direction of said pumping beam, each of said separated segments having a portion where said segment is completely separate from adjacent segments; and (b) thereafter recombining said separated segments to produce said recombined beam having said altered cross-sectional configuration corresponding generally to the cross-sectional configuration of said dye chamber window.

12. A method according to claim 11 wherein said initially produced cross-section of said pumping beam is substantially circular and said altered cross-sectional configuration is generally rectangular.

13. A method according to claim 12 wherein said steps of separating said pumping beam into said separated segments and recombining said separated segments additionally produces said recombined beam having a more uniform intensity profile in cross-section than said pumping beam prior to undergoing said method.

14. A method according to claim 13 wherein said pumping beam is separated into at least three said separated segments and said separated segments are thereafter recombined in at least a partially overlapping fashion producing said recombined beam which more uniformly illuminates said dye chamber window.

15. A method according to claim 14 wherein said pumping beam is separated into three axially extending separated segments.

16. A method according to claim 14 wherein said pumping beam is separated into five axially extending separated segments.

17. A method according to claim 13 wherein said pumping beam prior to undergoing said method has an intensity profile which includes a lower intensity central circular section and a higher intensity outer annular section.

18. A method according to claim 11 wherein said steps of separating said pumping beam into said separated segments and recombining said separated segments additionally produces said recombined beam having a more uniform intensity profile in cross-section than said pumping beam prior to undergoing said method.

19. In the operation of a lasing arrangement in which a continuous stream of dye is caused to flow through a lasing zone in a cooperating dye chamber while said lasing zone is being illuminated by light from a pumping beam having an initially produced cross-sectional configuration which is directed through a dye chamber window into said lasing zone of said dye chamber causing the dye within said lasing zone to lase and thereby produce or amplify a dye beam, a method of altering said initially produced cross-sectional configuration of said pumping beam so as to more uniformly illuminate said lasing zone, said method comprising the steps of:

(a) separating said pumping beam into a plurality of separated segments extending axially in the direction of said pumping beam, each of said separated segments having a portion which is completely separated from adjacent segments; and (b) thereafter recombining said separated segments in a predetermined, at least partially overlapping fashion producing a recombined beam having a cross-sectional configuration corresponding generally to said dye chamber window to more uniformly illuminate said lasing zone.

20. An optical assembly according to claim 3 wherein said first means acts on said pumping beam to separate it into three axially extending separated segments, including a central segment extending diametrically across said pumping beam and having a cross-sectional configuration corresponding generally to the cross-sectional configuration of said dye chamber window, and top and bottom axial segments on opposite sides of said central segment, and said second means recombines said separated segments by superimposing said top and bottom axial segments on said central segment.

21. A method according to claim 14 wherein said pump beam is separated into three axially extending separated segments, including a central segment extending diametrically across said pumping beam and having a cross-sectional configuration corresponding generally to said cross-sectional configuration of said dye chamber window, and top and bottom axial segments on opposite sides of said central segment, and said pump beam is recombined by superimposing said top and bottom axial segments on said central segment.

22. In a lasing arrangement according to claim 9, said predetermined fashion is dictated by the dimensions of said lasing zone in relation to the actual dimensions of said wholly separated segments, said predetermined fashion being that fashion which causes substantially all of said recombined beam to impinge upon said lasing zone.

* * * * *